(12) United States Patent
Takimoto

(10) Patent No.: US 7,390,014 B2
(45) Date of Patent: Jun. 24, 2008

(54) PROTECTING DEVICE FOR A PEDESTRIAN OR THE LIKE

(75) Inventor: Takayuki Takimoto, Shiga (JP)

(73) Assignee: Takata Corporation, Tokyo (JP)

( * ) Notice: Subject to any disclaimer, the term of this patent is extended or adjusted under 35 U.S.C. 154(b) by 377 days.

(21) Appl. No.: 10/950,014

(22) Filed: Sep. 24, 2004

(65) Prior Publication Data

US 2005/0098372 A1  May 12, 2005

(30) Foreign Application Priority Data

Nov. 7, 2003  (JP) ............................... 2003-378617

(51) Int. Cl.
*B60R 21/34* (2006.01)
*B60R 21/0136* (2006.01)

(52) U.S. Cl. ...................... 280/730.1; 180/274; 280/735

(58) Field of Classification Search ................. 180/274, 180/271; 280/730.1, 735
See application file for complete search history.

(56) References Cited

U.S. PATENT DOCUMENTS

| | | | | |
|---|---|---|---|---|
| 6,467,563 B1 * | 10/2002 | Ryan et al. | .................. | 180/274 |
| 6,474,679 B2 * | 11/2002 | Miyasaka et al. | ......... | 280/730.1 |
| 6,920,954 B2 * | 7/2005 | Hashimoto et al. | ........... | 180/274 |
| 6,955,238 B2 * | 10/2005 | Takimoto | ..................... | 180/274 |
| 7,211,752 B2 * | 5/2007 | Okamoto et al. | ....... | 200/61.58 R |
| 2005/0230937 A1 * | 10/2005 | Yatagai et al. | ............ | 280/728.1 |

FOREIGN PATENT DOCUMENTS

| | | | |
|---|---|---|---|
| DE | 19803165 | | 7/1999 |
| DE | 10014832 | | 10/2001 |
| DE | 10102597 | | 9/2002 |
| DE | 10254589 | | 6/2003 |
| EP | 1 681 212 | * | 1/2006 |
| GB | 2 417 930 | * | 3/2006 |
| JP | 6-239198 A | | 8/1994 |
| JP | 7-108903 A | | 4/1995 |
| JP | 2001-264146 A | | 9/2000 |
| JP | 2001-294108 A | | 10/2001 |
| JP | 2001-315519 A | | 11/2001 |
| JP | 2001-322518 A | | 11/2001 |
| JP | 2006-213153 | * | 8/2006 |
| JP | 2006-219085 | * | 8/2006 |
| JP | 2006-256447 | * | 9/2006 |

* cited by examiner

*Primary Examiner*—Paul N. Dickson
*Assistant Examiner*—George D. Spisich
(74) *Attorney, Agent, or Firm*—Fitch, Even, Tabin & Flannery

(57) ABSTRACT

A protecting device is provided for pedestrians that accounts for various conditions of the collision (physical constitution of the pedestrian, the position of collision, the speed of the motor vehicle at the time of collision, etc.). In one form, a first airbag unit for inflating a first airbag to cover a portion of the cowl top upon collision with the pedestrian is provided at the rear part of the bonnet/hood, or in the cowl top. Second airbag units having second airbags for covering A-pillars are provided within the respective A-pillars. When collision with a pedestrian is detected, the first airbag is inflated so as to cover the portion in the vicinity of the cowl top. The second airbags inflate 5 to 30 mSec behind the ignition of a gas generator of the first airbag unit, and cover the A-pillars substantially entirely.

11 Claims, 5 Drawing Sheets

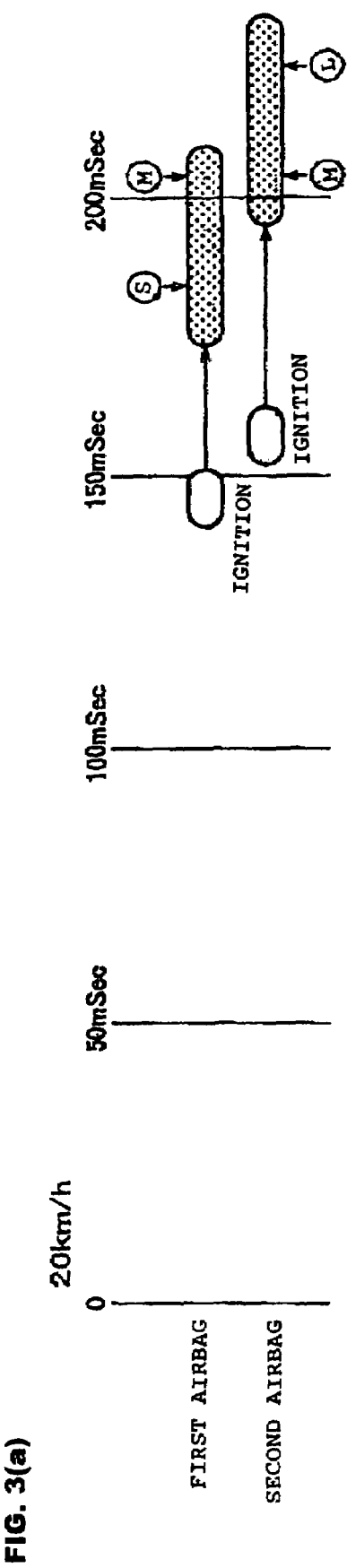
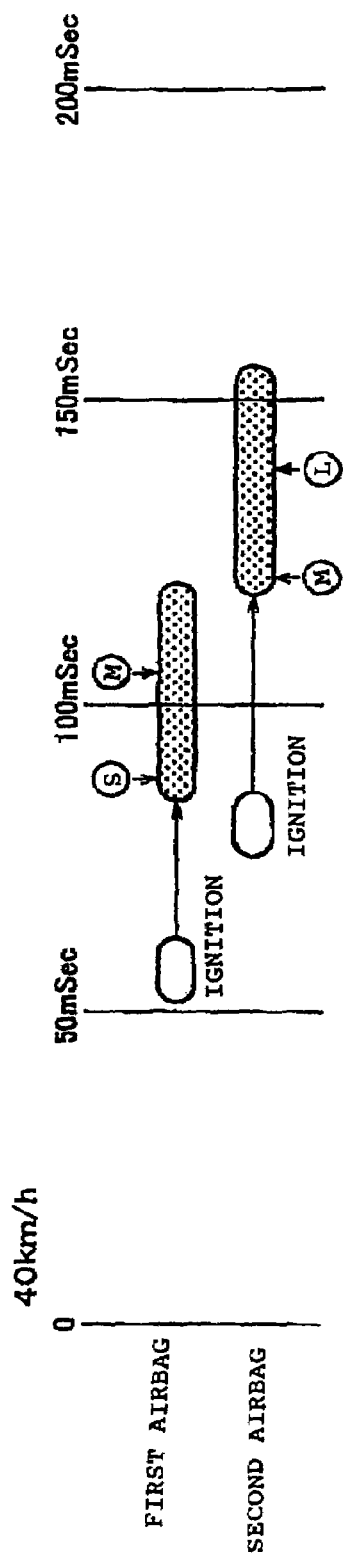
FIG. 3(a)
FIG. 3(b)

PROTECTING DEVICE FOR A PEDESTRIAN OR THE LIKE

FIELD OF THE INVENTION

The present invention relates to a protecting device for a pedestrian or the like by protecting a pedestrian or a rider of a bicycle or a motorcycle (hereinafter, referred to as a pedestrian or the like) from directly hitting portions of a vehicle body with high rigidity, such as a pillar or the like, when a motor vehicle collides with a pedestrian, a bicycle, or a motorcycle during travel.

BACKGROUND OF THE INVENTION

When a motor vehicle collides with a pedestrian, a bicycle, a motorcycle, or the like during travel, the pedestrian or the like is whisked at the lower half of his/her body by the front portion of a vehicle body of the motor vehicle, and thrown up and then fallen on a hood covering the upper surface of the front portion of the vehicle body, where he/she may be subjected to a secondary collision with the portion of high rigidity, such as a pillar or the like.

Japanese Unexamined Patent Application Publication No. 2000-264146 discloses a protecting device for pedestrians or the like which is adapted to protect the pedestrian or the like by inflating airbags along a cowl top and left and right A-pillars of the motor vehicle when the motor vehicle collides with the pedestrian or the like, and preventing and protecting the pedestrian or the like from hitting directly against the portion near the cowl top or the A-pillar.

Japanese Patent No. 2888116 (FIG. 7, in particular) discloses a protecting device for a pedestrian or the like including a hood airbag for covering major part of the hood from the center to the rear thereof and pillar airbags for covering the A-pillars.

SUMMARY OF THE INVENTION

The position of a motor vehicle where a head of a pedestrian or the like hits upon collision with the motor vehicle is different depending on the height, the weight, and the posture of the pedestrian and the speed of the motor vehicle or the like at the time of collision of the motor vehicle. Therefore, in order to protect the pedestrian or the like sufficiently, it is desirable that an air bag covers as large area of the outer surface of the vehicle body as possible, and is kept in an inflated state for as long time as possible (for example, 100 to several 100 s mSec), and an impact can be absorbed by allowing gas to be discharged when the pedestrian or the like hits.

However, securing a large area of the airbag and keeping the internal pressure at a predetermined value or higher for a long time are limited by the cost of the airbag or an inflator or by a space in the motor vehicle, and hence are not practical. In addition, maintaining the internal pressure of the airbag at a high level for a long time and allowing gas in the airbag to be discharged for absorbing an impact when the pedestrian hits are technically ambivalent especially when the capacity of the airbag is large, and hence it is not easy to design it so as to satisfy both requirements sufficiently.

It is an object of the present invention to provide a protecting device for a pedestrian or the like, which is superior in protecting property for the pedestrian or the like even when the conditions upon collision (the physical constitution of the pedestrian or the like and the speed of the motor vehicle at the time of collision).

A protecting device for a pedestrian or the like according to the present invention provided with an airbag to be deployed along the outer surface of a vehicle body and inflating means for the airbag to be inflated so as to cover at least the portion in the vicinity of a cowl top and second airbags to be inflated so as to cover at least part of A-pillars, and is characterized in that the second airbags are maintained in the inflated state for a predetermined period after inflation of the first airbag is completed.

The above-described predetermined period is 5 to 30 mSec, and preferably, 10 to 25 mSec, and more preferably, about 20 mSec.

According to the present invention, the inflating means is preferably configured to start inflation of the first airbag first, and then start inflation of the second airbags after a required period.

According to an embodiment of the present invention, the first airbag is inflated so as to cover the portion in the vicinity of the cowl top, the portion in the vicinity of the lower part of a windshield, and the lower parts of the A-pillars, and the second airbags are inflated so as to cover the upper parts of the A-pillars.

According to another embodiment of the present invention, the first airbag is inflated so as to cover the portion in the vicinity of the cowl top, and the rear part of the bonnet/hood, and the second airbags are inflated so as to cover the lower part of the windshield and the A-pillars.

In general, upon collision between a pedestrian or the like and a motor vehicle, as shown in FIG. 2, the smaller the physical constitution of the pedestrian or the like is, the more forward of the vehicle body the position of the secondary collision between the head and the vehicle body (may be referred to as head-hitting position, hereinafter) becomes and, while the larger his/her physical constitution is, the more rearward of the vehicle body the position of the secondary collision becomes. FIG. 2 is a plan view of a front portion of a passenger car, and "S" designates a head-hitting position for a person having a small physical constitution, "M" designates a head-hitting position for a person having a medium physical constitution, and "L" designates a head-hitting position for a person having a large physical constitution.

In general, the lower the speed at the time of collision is, the more forward of the vehicle body the head-hitting position becomes, while the higher the speed at the time of collision is, the more rearward of the vehicle body the head-hitting position becomes.

The smaller the physical constitution of the pedestrian or the like is, the shorter the period from the moment when the pedestrian or the like hits the front end of the vehicle body, falls onto the bonnet/hood, and hits his/her head against the vehicle body (duration before hitting head) would be, while the larger the physical constitution of the pedestrian or the like is, or the higher the speed of collision is, the longer duration before hitting head becomes.

According to the present invention, the pedestrian or the like can be protected even when the duration before hitting head varies depending on the physical constitution of the pedestrian or the like or the speed of the vehicle by maintaining the second airbags in an inflated state for the predetermined period after the completion of inflation of the first airbag. In this case, even when the first airbag and the second airbags are adapted to start inflation simultaneously, the second airbags can be maintained in the inflated state for a predetermined period after the completion of inflation of the first airbag by providing vent holes for allowing gas in the airbag to be discharged when the pedestrian or the like comes to hit thereon on the second airbags, by employing inflators for generating a larger amount of gas in the second airbags than in the first airbag, or even with the inflators which generate the same amount of gas, by adjusting the speed of gas flowing into the airbags so as to be slower for the second airbags.

In the present invention, when the configuration is adapted in such a manner that the first airbag for covering the portion near the cowl top is inflated in the early stage, and the second airbags for covering the A-pillars are inflated behind the inflation of the first airbag, the head can be received by the inflated airbag even when the head-hitting position or the duration before hitting head from the primary collision until the head-hitting moment vary due to difference in the physical constitution of the pedestrian or the like or the speed of collision.

In addition, the sizes (capacities) of the first airbag and the second airbags are not excessively large, and hence the volumes thereof are relatively small in a folded state, whereby a gas generator for inflating the respective airbags may be relatively small.

Since the respective airbags are not bulky, the time required for completing inflation is short, and, in addition, they can be inflated sufficiently quickly even when the vent holes are provided thereon. By the provision of the vent hole, gas is discharged from the airbag and hence an impact is absorbed when the pedestrian or the like hits against the airbag.

In the present invention, a configuration in which the first airbag is inflated so as to cover the portion in the vicinity of the cowl top, the lower part of the windshield, and the lower part of the A-pillar, and the second airbags are inflated so as to cover the upper parts of the A-pillars is preferable for a vehicle having a bonnet of medium length or of relatively short length.

The configuration in which the first airbag is inflated so as to cover the portion in the vicinity of the cowl top and the rear part of the bonnet/hood, and the second airbags are inflated so as to cover the lower part of the windshield and the A-pillars is preferable for a vehicle having a bonnet/hood of relatively long length.

BRIEF DESCRIPTION OF THE DRAWINGS

FIG. 2 is a plan view of a front portion of a passenger car showing a head-hitting position of a pedestrian or the like.

FIGS. 3(a) and 3(b) are drawings showing periods from the moment when a pedestrian or the like collides a motor vehicle until the first airbag and the second airbags receive the pedestrian or the like, respectively.

DETAILED DESCRIPTION OF THE PREFERRED EMBODIMENTS

Figure 1A:
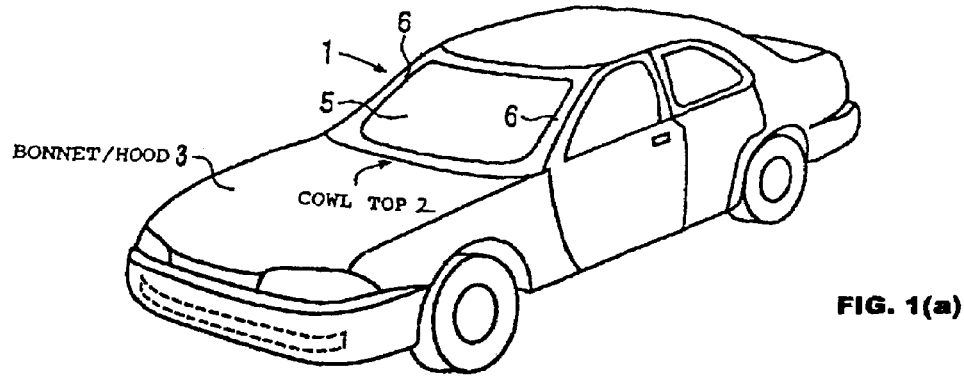
FIGS. 1(a)-(c) are perspective views showing a protecting device for pedestrian or the like according to an embodiment.

Hereinafter, referring to the drawings, an embodiment will be described. FIG. 1 is a perspective view of a motor vehicle provided with a protecting device for a pedestrian or the like according to the embodiment.

As shown in FIG. 1(a), a motor vehicle 1 is a medium sized four-door sedan of about 1000 to 3000 cc displacement, and a wrap around distance (WAD) of a cowl top 2 to the rear edge is about 1300-1900 mm. The rear part of a bonnet/hood 3 or the cowl top 2 is equipped with a first airbag unit for opening upon collision with a pedestrian or the like and inflating a first airbag 4. Although not shown in the drawing, the first airbag unit includes the first airbag 4, a container in which the first airbag 4 is stored in a folded state, an inflator 30 for inflating the first airbag 4 and a lid which covers the container in a normal state, and opens when the airbag 4 is inflated. The lid may form the outer surface of the vehicle body. The first airbag unit is disposed below the rear part of the bonnet/hood 3, and may be configured to push and open the rear part of the bonnet/hood 3 when the first airbag 4 is inflated.

Second airbag units having second airbags 7 for covering left and right A-pillars 6 of a windshield 5 are provided in the respective A-pillars 6. The positions for installing the second airbag units are not limited thereto, and the second airbag units may be provided at the positions other than the A-pillars (for example, in the bonnet/hood or the cowl top).

The second airbag unit for a pillar preferably includes the second airbag 7 folded and disposed in the pillar, a gas generator 32 for inflating the second airbags 7, and a cover member covering the second airbag 7 and forming the outer surface of the pillar, and is adapted in such a manner that the cover member is pushed and opened when the second airbag 7 is inflated.

Figure 1B:
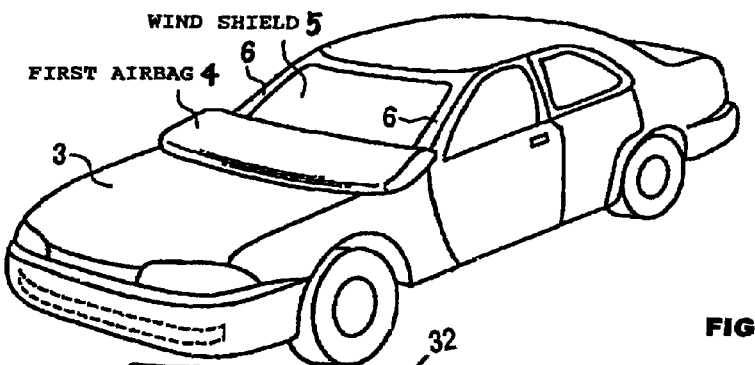

The respective airbags 4,7 have vent holes 34,36. A sensor for detecting collision with a pedestrian or the like is provided at the front part of the motor vehicle 1, and the detected signal of the sensor is supplied to an airbag unit control circuit. The airbag unit control circuit first ignites and operates the gas generator of the first airbag unit upon detection of collision with the pedestrian or the like, and inflates the first airbag 4 so as to cover the portion in the vicinity of the cowl top 2, the lower side of the windshield 5, the rear side of the bonnet/hood 3, and the portions in the vicinities of the lower ends of the respective A-pillars 6, 6 as shown in FIG. 1(b).

Figure 1C:
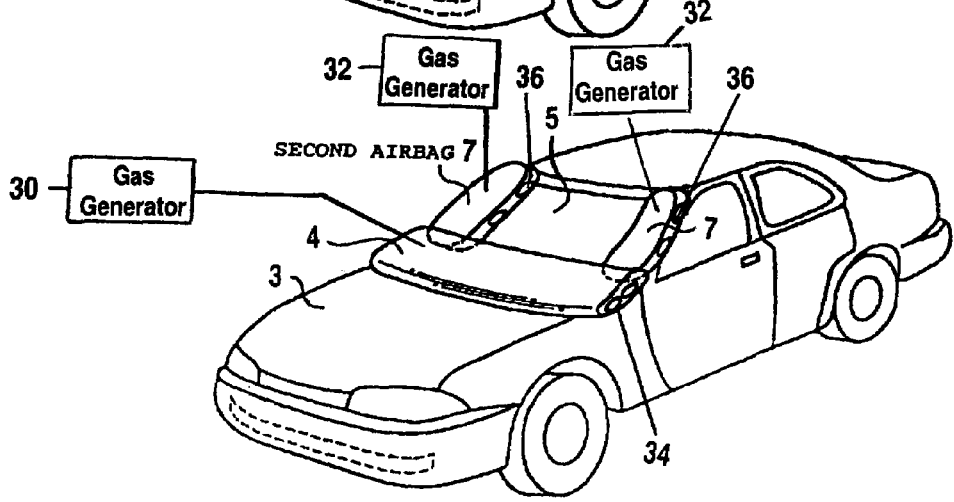

The gas generator of the second airbag unit is ignited about 5 to 30 mSec, for example, about 20 mSec behind the ignition and operation of the gas generator of the first airbag unit, and the second airbag 7 is inflated as shown in FIG. 1(c) after completion of inflation of the first airbag 4 to cover the A-pillar 6 substantially entirely. The pedestrian or the like is received by one or both of the inflated airbags 4, 7, and at this moment, inflation gas is discharged out from the vent hole so that an impact is absorbed.

Figure 2:
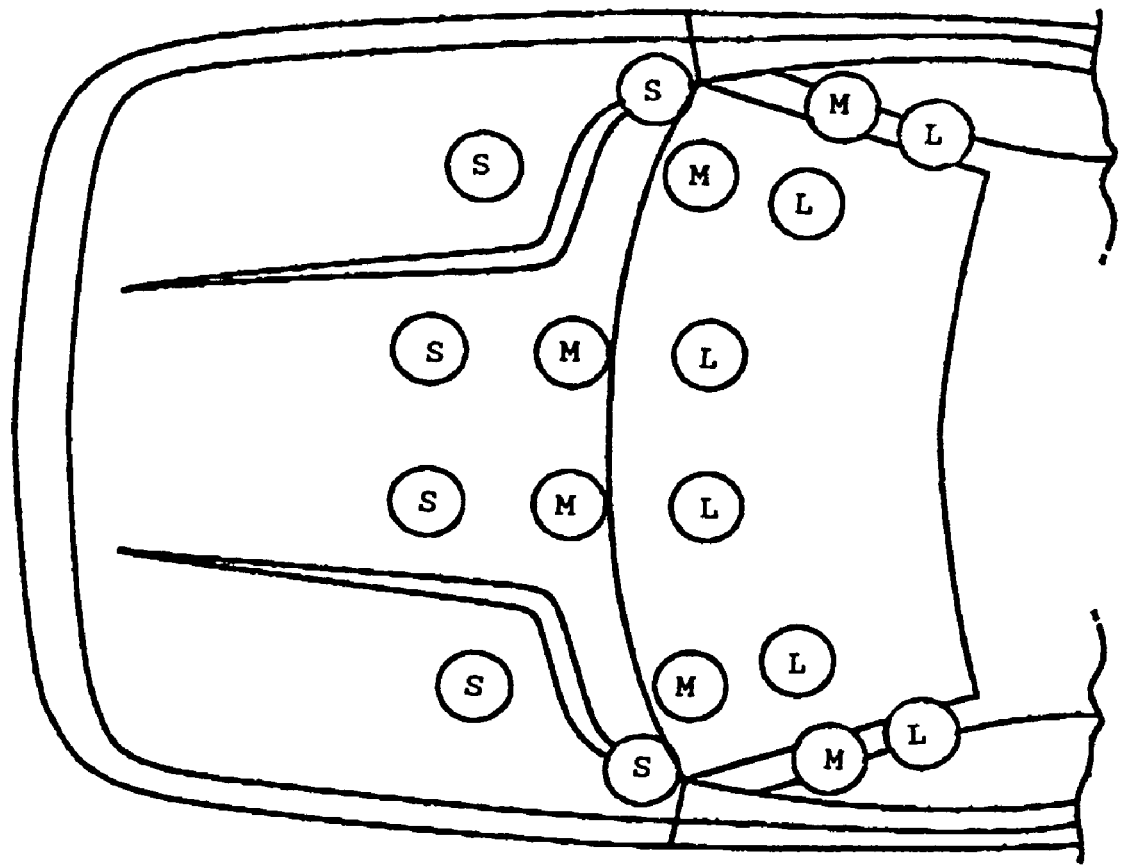

As shown in FIG. 2, normally, the smaller the physical constitution of a person is, the earlier and the more forward position of the vehicle his/her head hits, while the larger the physical constitution of a person is, the later and the more rearward position of the vehicle his/her head hits. The lower the speed at the collision is, normally, the more forward his/her head-hitting position becomes, while the higher the speed at the collision is, the more rearward his/her head hitting position becomes. When the head hits against the forward position, the duration before hitting head is normally longer than the case where the head hits against the rearward position.

In the present embodiment, the first airbag 4 is inflated at the position in the vicinity of the cowl top 2 in an earlier stage than the second airbags 7, and hence the head of the pedestrian or the like can be received by the inflated airbag irrespective of the size of the physical constitution, the speed of collision, or the length of the duration before hitting head as shown in FIGS. 3(a), (b). When the pedestrian or the like hits the motor vehicle at the position close to the side thereof and the position where his/her head hits is the A-pillar, the position where he/she hits his/her head becomes rearward than the case where he/she hits his head against the center of the motor vehicle, and hence duration before hitting head increases. However, since inflation of the second airbags 7 are later than that of the first airbag 4, the head of the pedestrian or the like can be received by the inflated second airbags 7 even when the head of the pedestrian or the like is about to hit the A-pillar.

In FIGS. 3(a) and (b), the areas with dots indicate a period that the airbag is inflated sufficiently. The characters "S", "M", and "L" indicate time points that a person of small physical constitution, a person of medium physical constitution, and a person of large physical constitution hits their head, respectively.

In this embodiment, the respective airbags 4, 7 cover relatively small areas, and hence the capacities thereof are relatively small. Therefore, the cost of the airbag and the cost of the gas generator are low, and storage spaces for the airbags may be small. In addition, the ratios between the capacities of the respective airbags and the flow rate of gas discharged through the vent holes (the size of the vent holes) are suitable, and hence the respective airbags 4, 7 can be inflated sufficiently quickly, and be maintained in the inflated state for a required period, and, in addition, the impact can be absorbed satisfactorily.

Figure 4A:
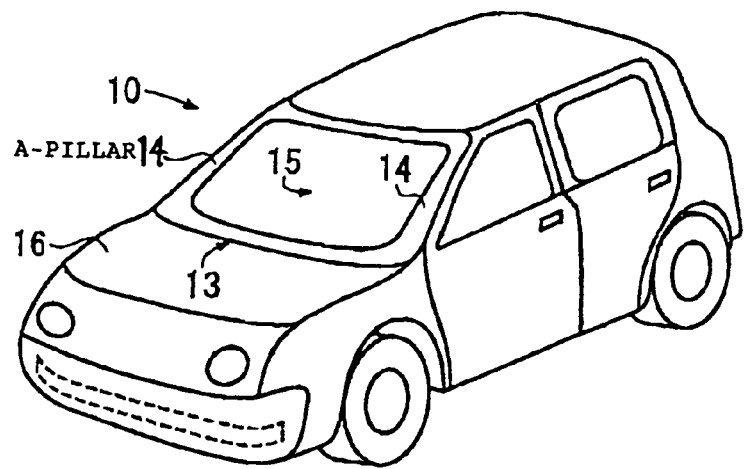
FIGS. 4(a)-(c) are perspective views showing a protecting device for pedestrian or the like according to another embodiment.
Figure 4B:
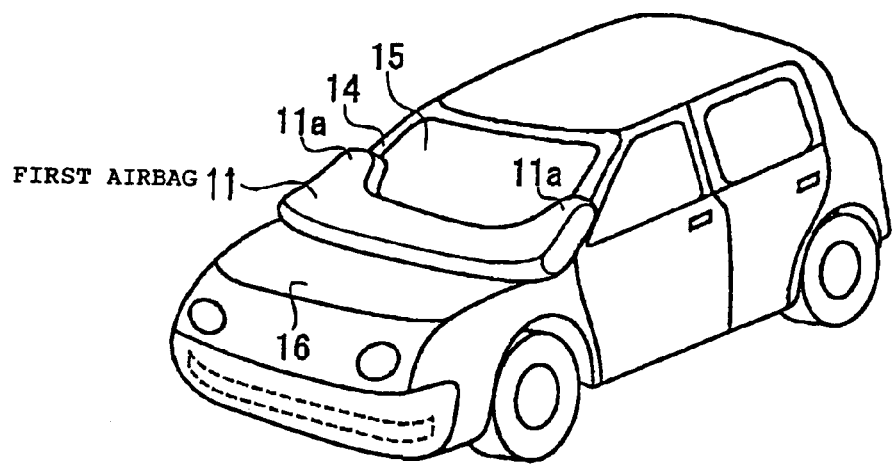
Figure 4C:
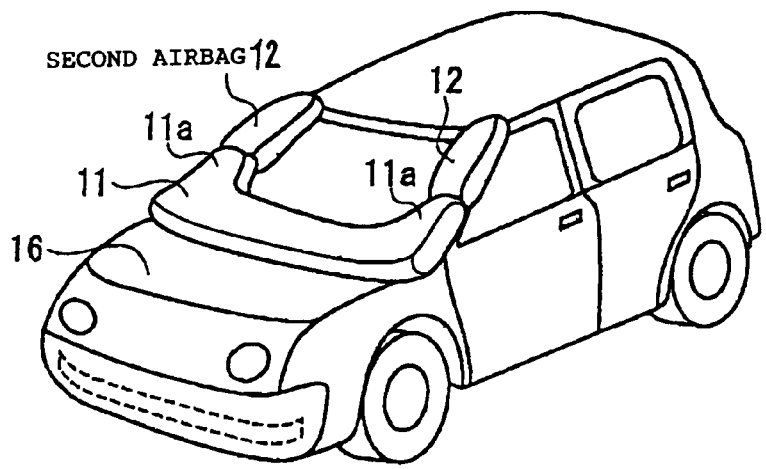

FIGS. 4(a)-(c) show an embodiment in which the present invention is applied to a motor vehicle 10 in which a length from the front end to the cowl top is relatively short. In the same manner as the above-described embodiment, a first airbag unit having a first airbag 11 which is inflated so as to cover the portion in the vicinity of a cowl top 13 and a second airbag unit having second airbags 12 which are inflated so as to cover the portions of the midsections of A-pillars 14 and upward thereof are provided. The first airbag 11 also covers the lower side of a windshield 15 and the rear side of a bonnet/hood 16.

In the case of this motor vehicle 10, the head-hitting position of the head of the pedestrian or the like is rearwardly of the position in the case shown in FIG. 1. Therefore, in the present embodiment, the first airbag 11 is provided with projections 11a for covering the portion from the lower parts of the A-pillars 14 to about the midsections thereof on the left and right sides thereof.

In the protecting device for pedestrian or the like, the first airbag 11 is inflated first and then the second airbags 12 are inflated after a required period.

With the protecting device for pedestrian or the like shown in FIGS. 4(a)-(c), the pedestrian or the like can be protected satisfactorily irrespective of the physical constitution of the pedestrian or the like or the position and the speed of collision.

Figure 5A:
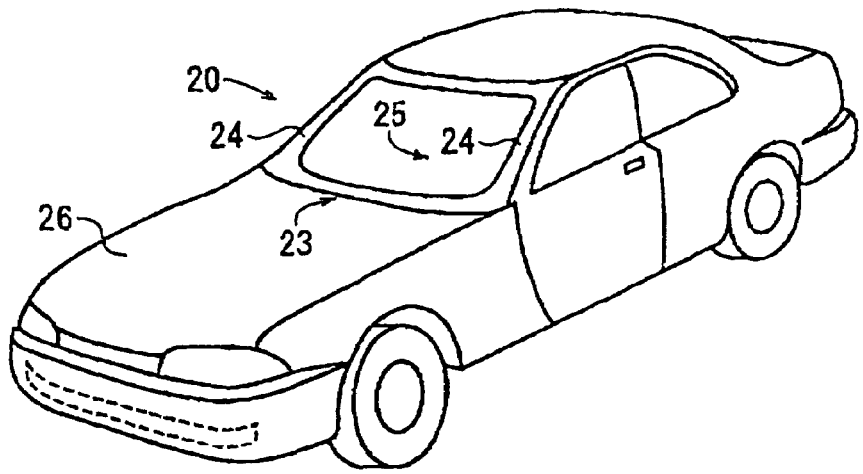
FIGS. 5(a)-(c) are perspective views showing a protecting device for pedestrian or the like according to still another embodiment.
Figure 5B:
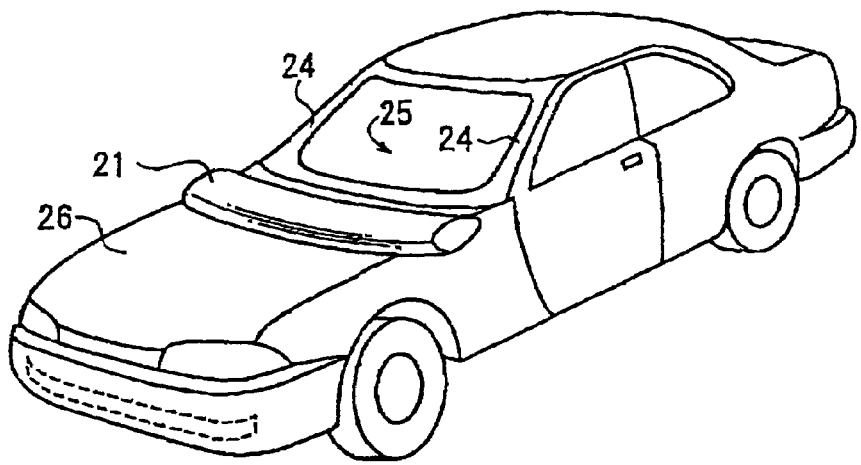
Figure 5C:
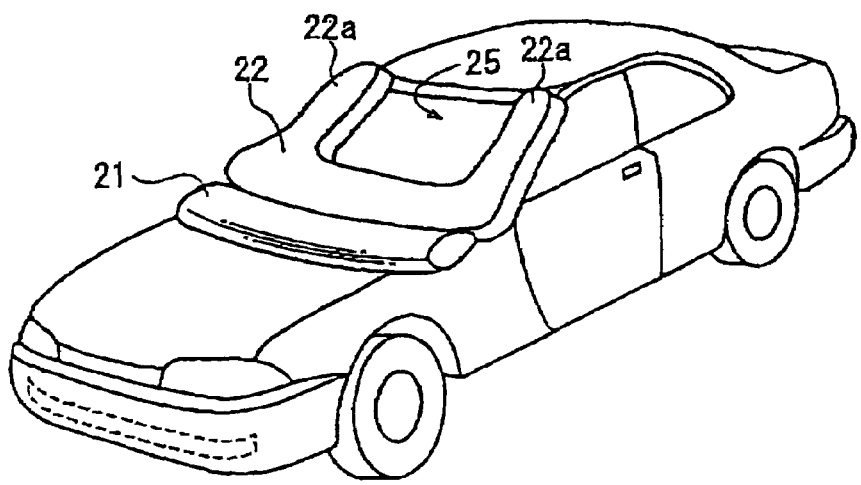

FIGS. 5(a)-(c) show an embodiment in which the present invention is applied to a motor vehicle 20 of long-nose type, in which the length from the front end to the cowl top is relatively long. As in the case of the above-described embodiment, a first airbag unit having a first airbag 21 which is inflated so as to cover the portion in the vicinity of a cowl top 23 and second airbag units having second airbags 22 which is inflated so as to cover A-pillars 24 are provided. The first airbag 21 also covers the rear side of the bonnet/hood 26.

In the case of the motor vehicle 20, the head-hitting position of the head of the pedestrian or the like is forwardly of the position in the case shown in FIG. 1. Therefore, the first airbag 21 is adapted to cover the portion forwardly of that in the case of the above-described embodiments, and mainly covers the rear end of the bonnet/hood 26 and the cowl top 23. It does not cover, or covers only partly, the lower side of a windshield 25.

The second airbags 22 extend laterally so as to cover the lower sides of the windshield 25 and the lower parts of the A-pillars 24 and are provided with projections 22a for covering the portion from the midsections to the upper parts of the A-pillars 24 on both left and right sides.

In the case of the protecting device for pedestrian or the like as well, the first airbag 21 is inflated first and the second airbags 22 are inflated after a required period.

With the protecting device for pedestrian or the like shown in FIG. 5, the pedestrian or the like can be protected satisfactorily irrespective of the physical constitution of the pedestrian or the like, or the position and the speed of collision.

Although the first airbag and the second airbags are provided separately in the above-described embodiments, it is also possible to provide the first airbag and the second airbag continuously and divide the interior of a single bag into chambers.

What is claimed is:

1. In combination, a pedestrian protecting device and a vehicle, the combination comprising:
   a hood and a windshield having pillars along either side thereof rearward of the hood;
   a first forward airbag to be deployed and inflated externally along the hood of the vehicle;
   a second rearward airbag distinct from the first, forward airbag to be deployed externally along at least one of the pillars of the vehicle after the first airbag is deployed so that the second airbag is inflated rearwardly from the first airbag;
   vent holes of the airbags for cushioned impact therewith;
   a first gas generator for inflating the first airbag;
   a second gas generator for inflating the second airbag, the second gas generator being actuated a predetermined time after the first gas generator, and the respective gas generators and airbags being sized so that full inflation of the respective airbags are maintained for predetermined time periods with the inflation time periods being sequential or overlapping, so that the first airbag stays fully inflated until the second airbag is fully inflated or for a predetermined time after full inflation of the second airbag such that irrespective of the size of a pedestrian, the pedestrian impacts against the fully inflated first or second airbags upon a secondary collision with the vehicle with the vent holes allowing inflation gas to escape from the airbags for cushioned impact therewith.

2. The combination of claim 1 wherein the second airbag is maintained in a fully inflated state for a predetermined period of between approximately 5 mSec to approximately 30 mSec after full inflation of the first airbag.

3. The combination of claim 1 wherein the first airbag includes a section extending laterally across the vehicle when deployed and the second airbag includes sections or distinct airbags that extend along either side of a windshield of the vehicle when deployed.

4. The protecting device of claim 1 wherein the first airbag has a rearward end portion and the second airbag has a forward end portion that engages against the first airbag rearward end portion with the airbags fully inflated so that there are no exposed portions of the vehicle in a fore-and-aft direction therealong with the airbags fully inflated.

5. An external airbag system for being deployed externally along a vehicle having a hood and a windshield rearward of the hood, the external airbag system comprising:
   a first airbag unit including a first airbag deployed to extend laterally across the vehicle hood;

at least one second airbag unit including a second airbag distinct from the first airbag deployed to extend along at least one side of the windshield; and engaging portions of the airbags so that there are no exposed external portions of the vehicle between the first and second airbags in a fore-and-aft direction along the vehicle with both of the airbags fully inflated;

wherein the airbag units each include a gas generator with the gas generators actuated sequentially so that the first and second airbags are deployed sequentially in a front to rear manner along the vehicle to coordinate inflation of the airbags with impact of a pedestrian along the vehicle when the vehicle is in a frontal collision with the pedestrian.

6. The external airbag system of claim 5 wherein the second airbag of the second unit is maintained in an inflated state for a predetermined time period after inflation of the first airbag of the first unit is completed.

7. The external airbag system of claim 6 wherein the predetermined time period is between approximately 5 mSec to approximately 30 mSec.

8. The external airbag system of claim 5 wherein the second airbag is maintained in an inflated state for a predetermined time period after inflation of the first airbag of the first unit is completed by one of: (1) vent holes in the second airbag of the second unit; and (2) sizing the gas generator of the second airbag unit to generate a greater volume of gas than the gas generator of the first airbag unit or generating gas from the gas generator of the second airbag unit at a slower rate than the gas generator of the first airbag unit.

9. The external airbag system of claim 5 wherein the at least one second airbag unit comprises a pair of second airbag units and a pair of second airbags arranged so that the second airbags thereof extend along opposite sides of the windshield.

10. The external airbag system of claim 9 wherein the first airbag of the first airbag unit has a generally U-shaped configuration including a pair of side projections extending to an intermediate position along either side of the windshield when inflated generally aligned with corresponding ones of the inflated second airbags of the second airbag units.

11. The external airbag system of claim 5 wherein the second airbag of the second airbag unit has a generally U-shaped configuration including a laterally extending portion along the windshield and a pair of side projections that extend along either side of the windshield when inflated.

* * * * *